United States Patent

Williams Barry N.

Patent Number: 5,201,212
Date of Patent: Apr. 13, 1993

[54] LINE LEAK DETECTOR AND METHOD

[75] Inventor: Williams Barry N., Rosharan, Tex.

[73] Assignee: Tanknology Corporation International, Houston, Tex.

[21] Appl. No.: 840,720

[22] Filed: Feb. 21, 1993

Related U.S. Application Data

[63] Continuation-in-part of Ser. No. 654,939, Feb. 13, 1991, abandoned.

[51] Int. Cl.⁵ .................... G01M 3/26; G01M 3/28
[52] U.S. Cl. .................... 73/40.5 R; 73/49.2; 364/509; 364/564
[58] Field of Search ........... 73/40.5 R, 49.1, 49.5, 73/49.2; 364/509, 506, 550, 554, 556, 564, 565

[56] References Cited

U.S. PATENT DOCUMENTS

| | | | |
|---|---|---|---|
| 2,952,387 | 9/1960 | Fowler et al | 73/40.5 R |
| 3,580,055 | 5/1971 | White | 73/49.2 |
| 3,910,102 | 10/1975 | McLean | 73/40.5 R |
| 4,114,426 | 9/1978 | McLean | 73/40.5 R |
| 4,285,229 | 8/1981 | Garcia et al. | 73/40 |
| 4,384,475 | 5/1983 | Burgess et al. | 73/40.5 R |
| 4,424,716 | 1/1984 | Boehringer et al. | 73/861.56 |
| 4,518,955 | 5/1985 | Meyer | 340/605 |
| 4,561,291 | 12/1985 | Ainlay | 73/49.2 |
| 4,821,559 | 4/1989 | Purpora | 73/40.5 R |
| 4,850,223 | 7/1989 | Corlin et al. | 73/49.2 |
| 4,852,054 | 7/1989 | Mastandrea | 73/49.2 |
| 4,876,530 | 10/1989 | Hill et al. | 73/49.1 |
| 4,896,528 | 1/1990 | Lewis | 73/40.7 |
| 4,918,968 | 7/1990 | Hoffman | 73/40.5 R |
| 5,065,616 | 11/1991 | Schuster | 73/49.2 |

FOREIGN PATENT DOCUMENTS

| | | |
|---|---|---|
| 131756 | 11/1987 | European Pat. Off. . |
| 0250561 | 1/1988 | European Pat. Off. . |
| 2603715 | 7/1979 | Fed. Rep. of Germany . |
| 3606543 | 9/1987 | Fed. Rep. of Germany . |
| 2617285 | 12/1988 | France . |
| 8912216 | 12/1989 | PCT Int'l Appl. . |
| 523286 | 7/1976 | U.S.S.R. . |
| 1357741 | 12/1987 | U.S.S.R. . |

OTHER PUBLICATIONS

William J. Purpora, "How Technology Has Changed in Precision Volumetric Line Testing", vol. 5 No. 1 *Tank Talk* 2 (Jan. 1990).

Brochure, "LDT-880 Leak Detector Testing System", distributed by Purpora Engineering, Inc. in Glendale, Wis.

Brochure, "Operating Instructions for LDT880", Revised Apr. 24, 1989, 4 pages, Vaporless Manufacturing, Inc. and Purpora Engineering, Inc.

*Primary Examiner*—Hezron E. Williams
*Assistant Examiner*—Michael Brock
*Attorney, Agent, or Firm*—Vanden, Eickenroht, Thompson, Boulware & Feather

[57] ABSTRACT

An apparatus and method for employing the apparatus in testing underground fluid containing lines for leaks. The apparatus comprises (a) a differential pressure transducer mounted to a reservoir for indicating volumetric change in the reservoir; (b) a temperature transducer mounted in the reservoir for monitoring temperature fluctuation in the reservoir; (c) a gauge pressure transducer mounted in the reservoir; (d) a remote temperature sensor and a data acquisition and processing system. The method for employing the apparatus comprises of connecting the apparatus to the line under test and entering certain parameters of a line under test and product temperature into the test computer. The test system then monitors volumetric change in the reservoir as well as pressure and temperature fluctuations in the line under test at 30 second intervals. At the end of the predetermined test period, the system calculates the leak rate during each five minute interval of the test as well as a cumulative leak rate. The trends in the leak rate data during the test are then analyzed to determine whether the calculated cumulative leak rate is accurate.

16 Claims, 8 Drawing Sheets

LINE LEAK DETECTOR AND METHOD

BACKGROUND OF THE INVENTION

This application is a continuation-in-part of my co-pending application Ser. No. 07,654,939 filed with the United States Patent and Trademark Office on Feb. 13, 1991, now abandoned.

FIELD OF THE INVENTION

This invention pertains generally to an apparatus and method for detecting leaks in underground supply lines for gasoline and other hydrocarbon fuels. More specifically, the invention pertains to detecting leaks in a supply line between a fuel pump and an underground reservoir containing gasoline at a gasoline service station.

DESCRIPTION OF THE PRIOR ART

Today's society is becoming increasingly dependent on transportation fueled by hydrocarbons while failing to significantly develop alternative fuel sources. At the same time, society is becoming more concerned with the quality of the natural environment. The first condition has led to a virtual explosion in the number of gasoline service stations in the last couple of decades that shows no signs of abating. The latter condition has manifested itself in stricter governmental regulations to avoid or minimize environmental contamination from operation of service station facilities.

Each service station is essentially a self-contained gasoline dispensing unit. While large pipeline networks are employed in petroleum production fields to connect various units of the field to a central distribution point, the same is not true in the distribution of refined petroleum to service stations. Each service station typically has one or more reservoirs buried under the ground for storing gasoline that are periodically resupplied with gasoline trucked in from various locations.

The fuel is pumped from the storage tank to the dispenser by a submersible pump which is activated when the dispenser switch is turned on and deactivated at the end of the dispensing operation. Normally, a check valve is incorporated in the pump assembly so that at the end of a dispensing cycle, the product line retains the fuel that has been pumped into it, thus permitting the gasoline to be delivered immediately at the start of the next dispensing cycle. A pressure relief valve built into the pump assembly is used to relieve the product line pressure to a level of 11-15 psi following the end of each dispensing cycle. Because of the positive pressure that is maintained in the product line, any leaks in the piping between the check valve and the dispenser can result in significant amounts of fuel leaking from the product line and contaminating the subsoil and groundwater.

The lines have therefore become a source of concern for many environmentalists. The primary concern arises from the potential for contamination of underground water supplies caused by leaking gasoline or other refined petroleum products. In response to political pressures exerted by environmental and other interest groups, governmental authorities have imposed strict controls on the operation of such underground reservoirs to prevent contamination and to help arrest the deteriorating state of the environment.

Enforcement of these regulations, coupled with the increasing number of gasoline service stations, has created a new and significant demand for testing procedures and equipment capable of detecting ever smaller amounts of leaking gasoline. For instance, current U.S. governmental regulations specify that the maximum allowable leakage in underground reservoirs and associated lines be no greater than 0.1 gallons per hour and it is expected that future standards will be even lower.

Most of the equipment and procedures currently known in the art for testing the line between the underground reservoir and the dispensing pump are not sufficiently accurate, and lack the greater resolution and precision required, to test against the lower standards. Improved methods such as that described in U.S. Pat. No. 4,462,249 have made it possible to test the underground reservoir for leaks even smaller than the 0.1 gal/hr maximum, but so far as is known, no methods capable of such precision are available for testing the lines for such leaks.

The test equipment and method now in use involves a pressurized reservoir that is graduated for volumetric measurement. The pressurized reservoir is connected to the line under test which is then pressurized. After the line is pressurized, the reservoir is monitored for fluid loss into the line. Vapor pockets sometimes form in the line under test but are normally removed by repeatedly pressurizing and depressurizing the line until the vapor collects at one end of the line whereupon it is bled off. This system and method of testing is adversely impacted by volumetric changes caused by temperature variations in the line, the difficultly in accurate determination of volumetric change in the reservoir, human error in operator measurements and calculations, and the operator's exercise of judgment at the end of the test.

Another approach is found in U.S. Pat. No. 3,439,837 issued to Hearn et alia on Apr. 22, 1969. This patent teaches testing for leaks by measuring the differential pressure between the line under test and another line in which a reference pressure is first established. However, on information and belief, the apparatus disclosed in that patent is relatively complex and difficult to calibrate for the simple measurements obtained and the method disclosed does not obtain information with sufficient resolution to test against the new standards. Furthermore, the determining measurements are indirect relative to the line under test and therefore more subject to error.

U.S. Pat. No. 4,876,530 is directed to a method and apparatus for detecting leakage from underground fuel tanks and also from the pressurized lines which deliver the fuel to the dispensers. The specification of that patent describes the use of "special measures" which are said to be taken to distinguish thermal contraction from an actual leak in the line which rely upon "the physical fact that the pressure of volume decay caused by thermal contraction decreases with time, whereas the volume decay caused by a leak does not." The method described therein, however, isolates the line(s) under test from the rest of the product storage and delivery system, introducing a number of variables into the line leak test which decrease the reliability and precision of the test. In short, so far as is known, no accurate, reliable, and simple leak test for just the lines is available, and there is a need for such a test for both environmental reasons and in light of the above-described, exacting governmental regulations.

It is therefore a feature of this invention that it will measure leakage with sufficient accuracy to meet the precision required under governmental standards.

It is a further feature of this invention that it will account for the effects of temperature deviations in the line and the system during the test run.

It is still a further feature of this invention that it incorporates a more accurate method of determining volumetric change in the test reservoir.

It is still a further feature of this invention that it automates a larger portion of the testing in order to eliminate or reduce opportunity for introducing human error into the procedure.

SUMMARY OF THE INVENTION

The invention comprises an apparatus and a method for testing the leakage rate of fluid from a liquid fluid containing line such as the line between the liquid containing underground reservoir of a gasoline service station and the impact valve to which the line is connected. The apparatus comprises an instrument package modified to include (a) a differential pressure transducer mounted to a reservoir for indicating volumetric change in the reservoir; (b) a temperature transducer mounted in the reservoir for monitoring temperature fluctuation in the reservoir; (c) a gauge pressure transducer mounted in the reservoir; (d) a remote temperature sensor; and (e) a data acquisition and processing system. The method comprises the steps of connecting the apparatus to the line under test, isolating the line from the impact valve and underground reservoir, and pressurizing the fluid in the isolated line having the test apparatus connected thereto. The test system then monitors volumetric change in the reservoir as well as pressure and temperature fluctuations in the system and line under test at preselected time intervals. At the end of a predetermined test period, the system calculates the leak rate during each five minute interval of the test as well as a cumulative leak rate. Fluctuations and trends in the leak rate data during the test are examined against preselected criteria of change to determine whether the calculated cumulative leak rate is an accurate measurement of the actual rate of leakage of the liquid fluid from the fluid filled line.

BRIEF DESCRIPTION OF THE DRAWINGS

So that the manner in which the above recited features of the invention, as well as others that may become apparent, are attained and can be understood in detail, a more particular description of the invention briefly summarized above may be had by reference to the exemplary preferred embodiment thereof illustrated in the drawings that form a part of this specification. The appended drawings nevertheless illustrate preferred embodiments of the invention and are not to be considered limiting of its scope.

IN THE DRAWINGS

DESCRIPTION OF THE PREFERRED EMBODIMENT

Figure 1:
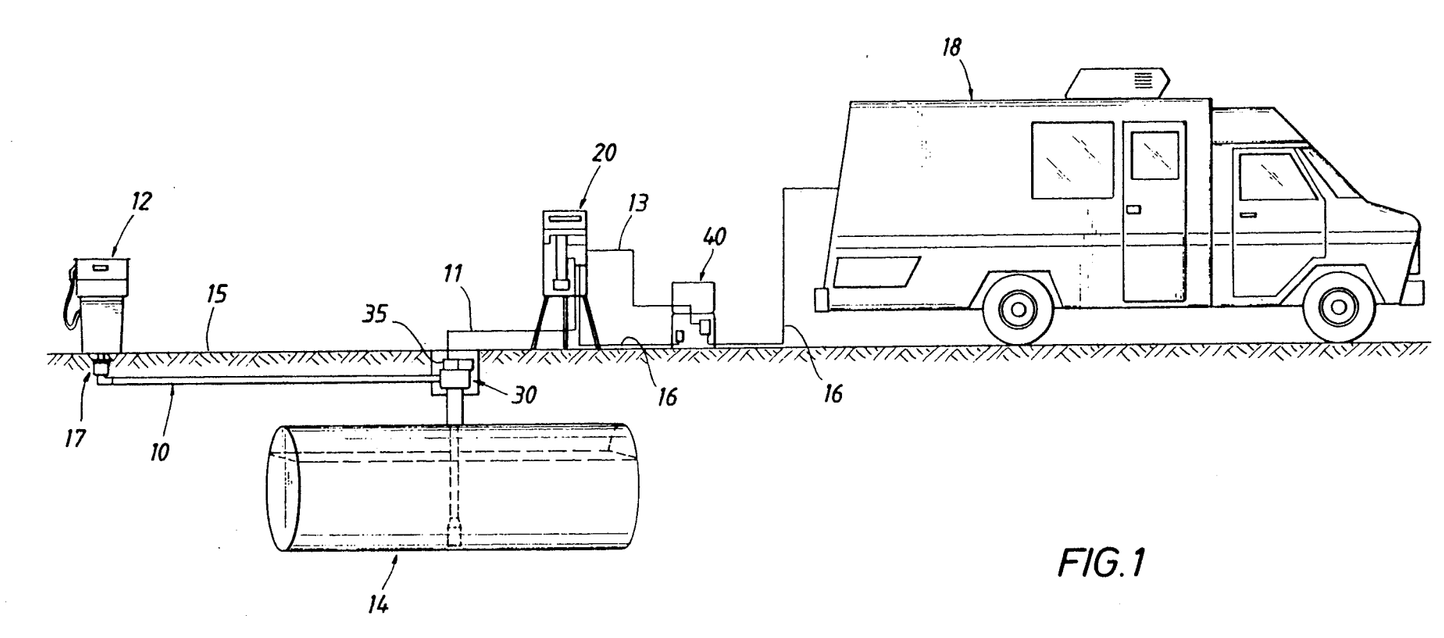
FIG. 1 is an illustration of the apparatus of the invention as set up and employed for use in testing.

FIG. 1 illustrates the invention as it is employed to test an underground line. Line 10, reservoir 14, submersible pump 30, impact valve 17, and dispensing pump 12 are all standard equipment commonly found installed at gasoline service stations as is shown. Isolation plug 35, instrument package 20, computational package 40, and lines 11, 13, and 16 in the preferred embodiment are transported to different service stations by truck 18 and assembled for testing.

The apparatus of the invention in its preferred embodiment comprises instrument package 20, line 11, line 13, computational package 40 and line 16. Instrument package 20 is connected to line 10 when line 10 is under test via line 11 and through isolation plug 35 (see FIG. 3) installed in submersible pump 30. Submersible pump 30 normally pumps gasoline from underground reservoir 14 to dispensing pump 12 via line 10 and impact valve 17 but instead isolates line 10 from reservoir 14 when modified using isolation plug 35. Instrument package 20 is further connected to computational package 40 via line 13 and to a pressurized source of nitrogen aboard truck 18 through line 16.

Figure 2:
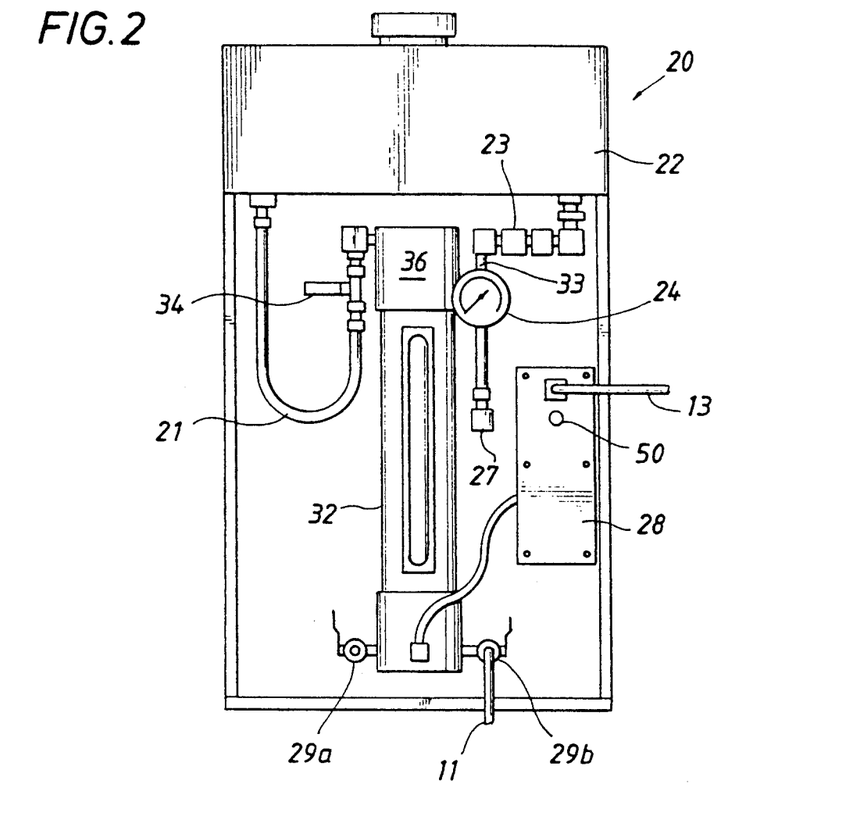
FIG. 2 is a more detailed depiction of the instrument package of the apparatus in FIG. 1.
Figure 5:
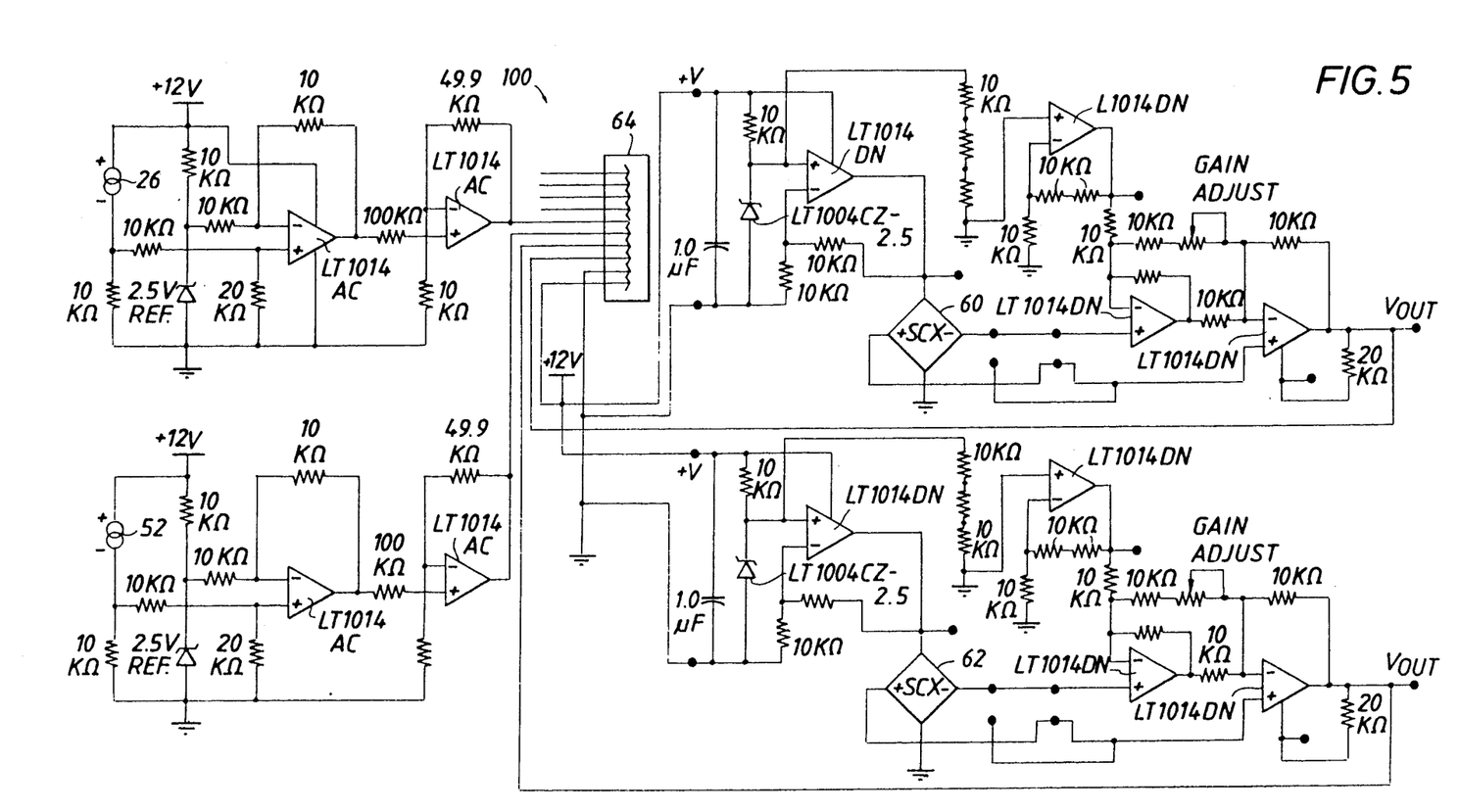
FIG. 5 is a schematic diagram of the temperature data and acquisition circuitry housed in the instrumentation package of FIG. 2.

FIG. 2 illustrates instrument package 20 of the presently preferred embodiment shown in FIG. 1 in greater detail. Instrument package 20 is a modification of a prior art device constructed and used by Tanknology Corporation International of Houston, Tex. The prior art device has been adapted by the addition of temperature transducer 26, gauge pressure transducer 60, differential pressure transducer 62, remote temperature sensor 52, and signal processing system 100, the latter three being located beneath cover 28 and all being shown schematically in FIG. 5. Temperature transducer 26 in the preferred embodiment is a standard thermistor or thermocouple, as is remote temperature sensor 52, that is connected to instrument package 20 and jack 50 by plug 38 through cable 54 for a purpose to be described below. Gauge pressure transducer 60 is used to measure the pressure exerted on the fluid by the inert gas, the pressure being measured relative to atmospheric pressure.

Differential pressure transducer 62 is used to determine the mass of fluid captured in a test reservoir, or graduated cylinder, 32 as more fully described below by measuring the differences in pressure between the top and bottom of cylinder 32. Differential pressure transducer 62 may be any one of several commercially available transducers. For example, model SCX01D (Sensym, Inc., Sunnyvale, Calif.), 10 PC series (Microswitch Division of Honeywell, Inc., Freeport, Ill.) and P3061-20 WD (Lucas Schaevitz, Inc., Pennsauken, N.J.) transducers have all been used to varying degrees of advantage, the latter representing the presently preferred transducer. The Microswitch transducer is sensitive to common mode pressure, e.g., output changes over the range of the pressure differential, such that the output from pressure transducer 60 must be used to correct the output from that particular transducer 62.

The central component of instrument package 20 is the test reservoir, which in the preferred embodiment is graduated cylinder 32. The content of graduated cylinder 32 is controlled by filling with liquid fluid contained in holding tank 22 through line 21 when filler valve 34 is opened. The content is also controlled by injecting nitrogen or some other suitable gas into cylinder 32 from a pressurized source via quick-connector 27, valve 25, and line 33. In addition to nitrogen, any inert gas that is non-flammable is also suitable. Pressure exerted by the contents of cylinder 32 is controlled by monitoring gauge 24 and by bleeding gas through relief valve 23 in line 33. Outlet valves 29a-b are used to drain the liquid content of cylinder 32. Outlet valve 29a is a one-quarter inch outlet valve with a quick disconnect and outlet valve 29b is a one-half inch outlet valve with a quick disconnect, both as are well known in the art.

Figure 3:
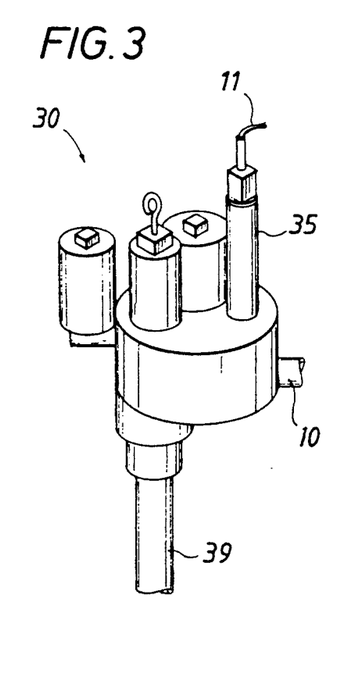
FIG. 3 is a perspective view of a portion of the submersible pump as it is depicted in FIG. 1 with an isolation plug installed.

FIG. 3 illustrates submersible pump 30 having the isolation plug 35 installed therein. Line 10 is isolated from underground reservoir 14 by the installation of isolation plug 35 in submersible pump 30 and is consequently placed in fluid flow communication with line 11. Such isolation plugs and their use are commonly known among those skilled in the art. Instrumentation package 20 of FIGS. 1-2 is connected to isolation plug 35 via line 11. Isolation plug 35 requires either quarter-inch or half-inch connectors on line and thus the necessity for having both outlet valve 29a and b on instrumentation package 20. Thus, modifying submersible pump 30 with isolation plug 35 isolates line 10 and places it in fluid flow communication with line 11.

Impact valve 17 shown in FIG. 1 is designed to shut off excessive fluid flow through line 10 during normal operation to prevent large gasoline spills that may occur if dispensing pump 12 is damaged or malfunctions. Valves such as impact valve 17 are required by federal regulations for each pump such as dispensing pump 12. As is well known in the art, impact valve 17 also has a manual switch that will also block fluid flow when appropriately set in order to perform routine maintenance and inspection of dispensing pump 12. Impact valve 17 is used in this manner to isolate line 10 from dispensing pump 12. Line 10 is therefore isolated from both underground reservoir 14 and dispensing pump 12 for testing purposes.

Figure 4:
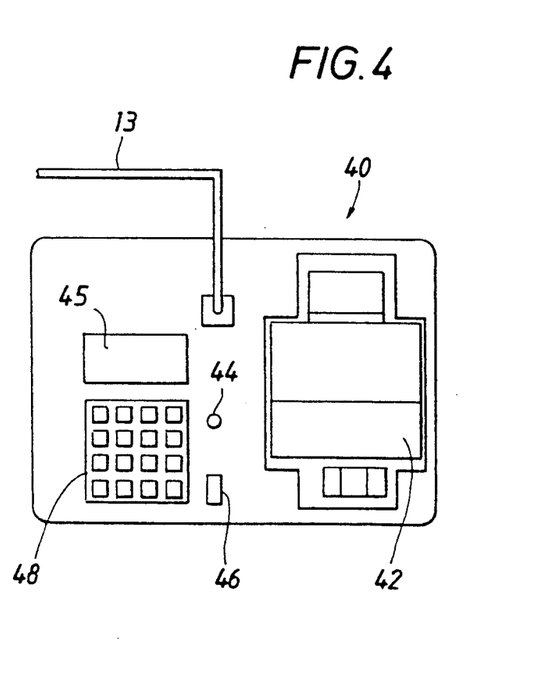
FIG. 4 is an enlarged depiction of the computational package of the apparatus as viewed from the top and as depicted in FIG. 1.
Figure 6A:
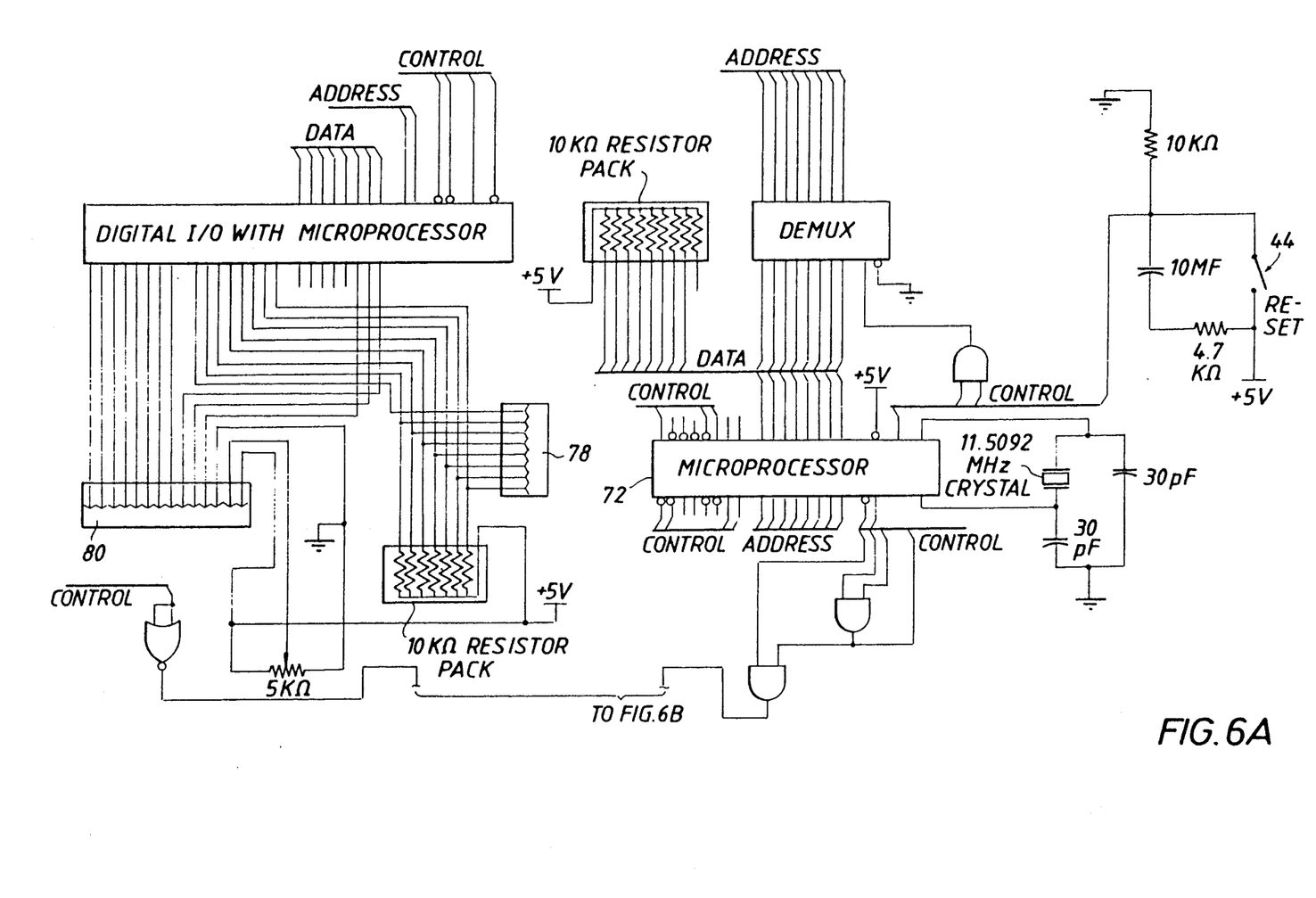
FIG. 6A and 6B are a schematic diagram of the data processing, analog-to-digital converting, and input/output circuitry of the computational package of FIG. 4.
Figure 6B:
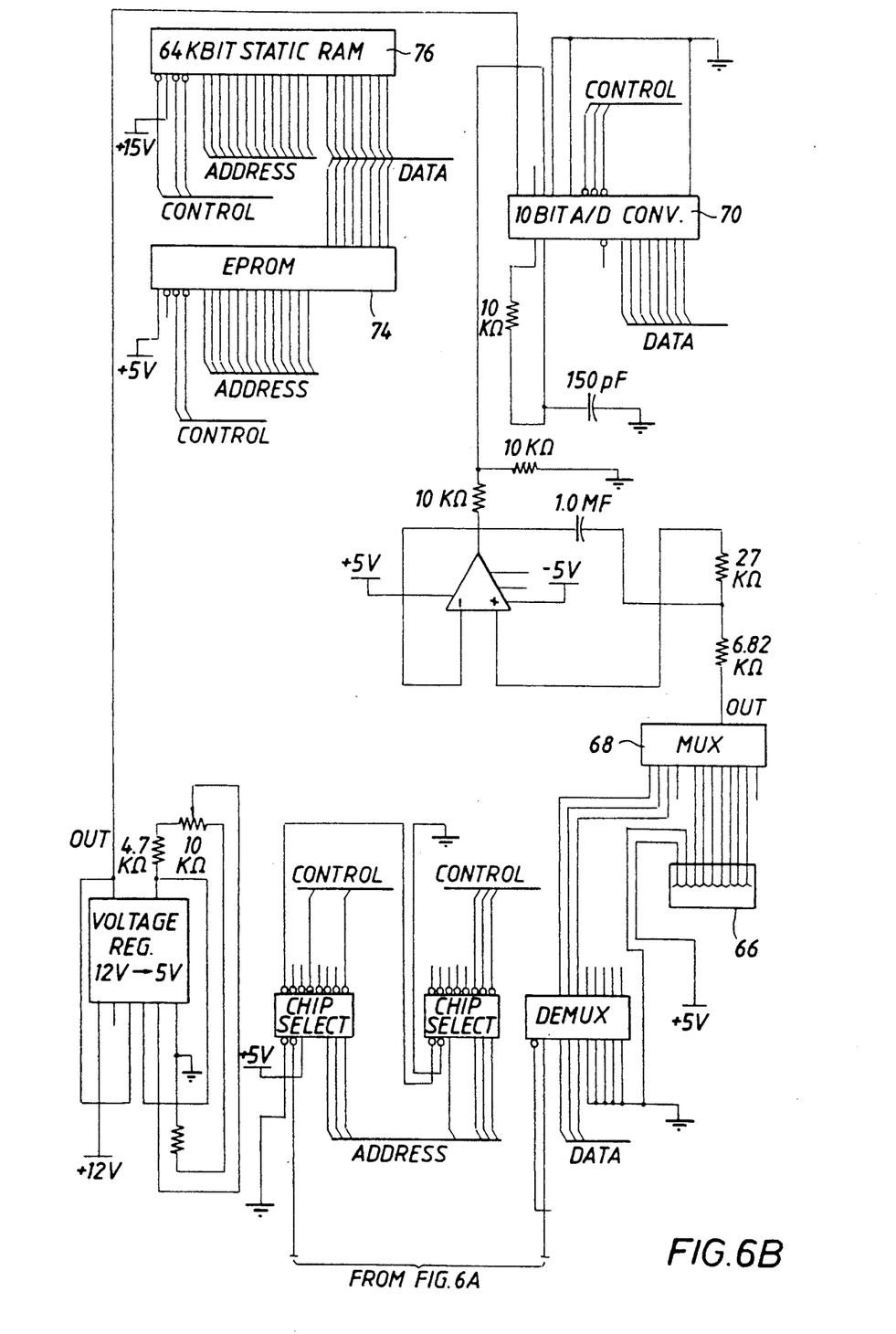
Figure 7:
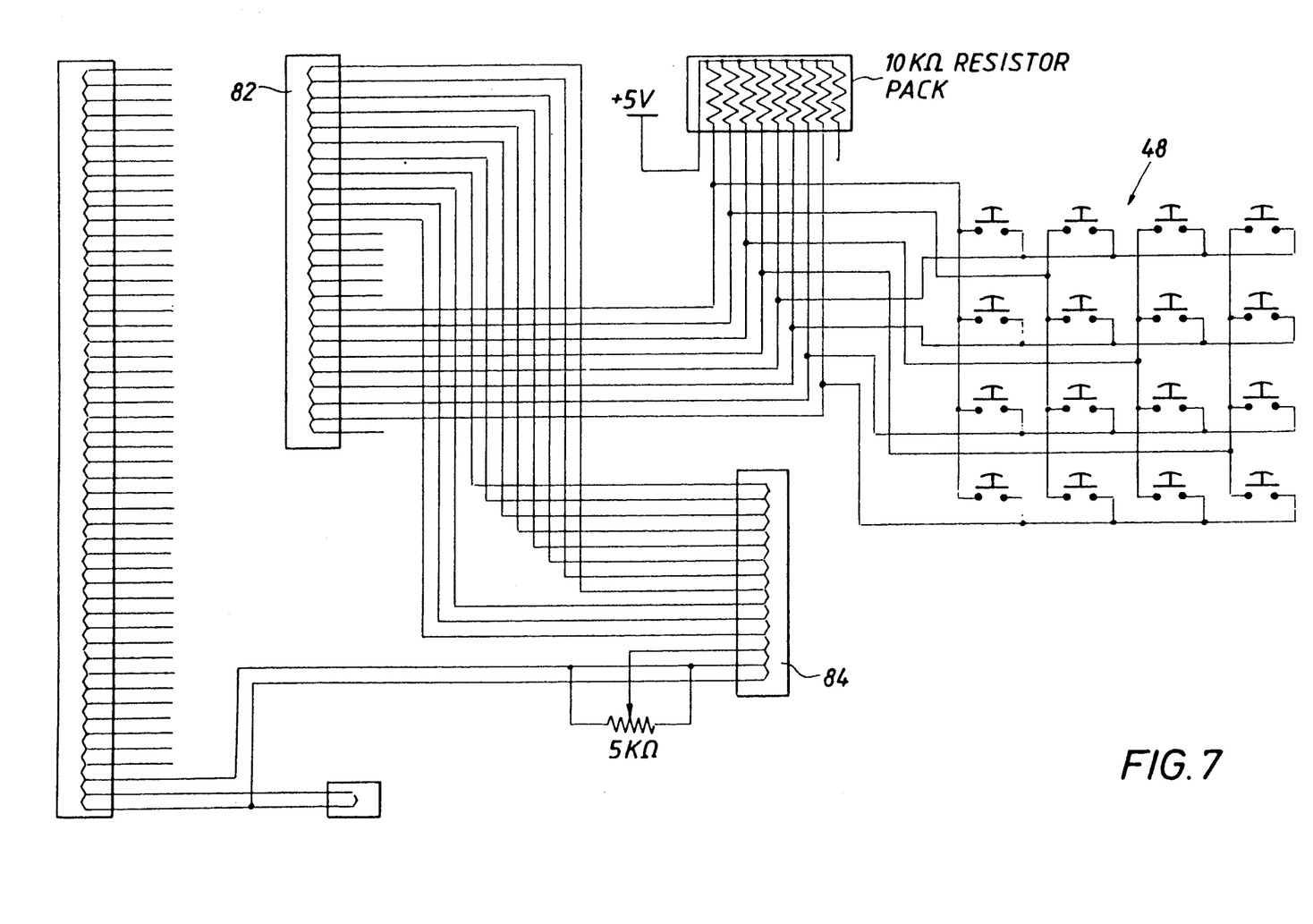
FIG. 7 is a schematic diagram of the keypad and associated connectors of the computational package of FIG. 4.

Computational package 40 of FIG. 1 is illustrated in greater detail in FIG. 4. Computational package 40 in its preferred embodiment is a formed aluminum case manufactured for housing instrumentation. The case of computational package 40 includes several electrical circuits depicted schematically in FIGS. 6A-B with some interactive components mounted on the top and whose schematic is shown in FIG. 7.

Figure 8A:
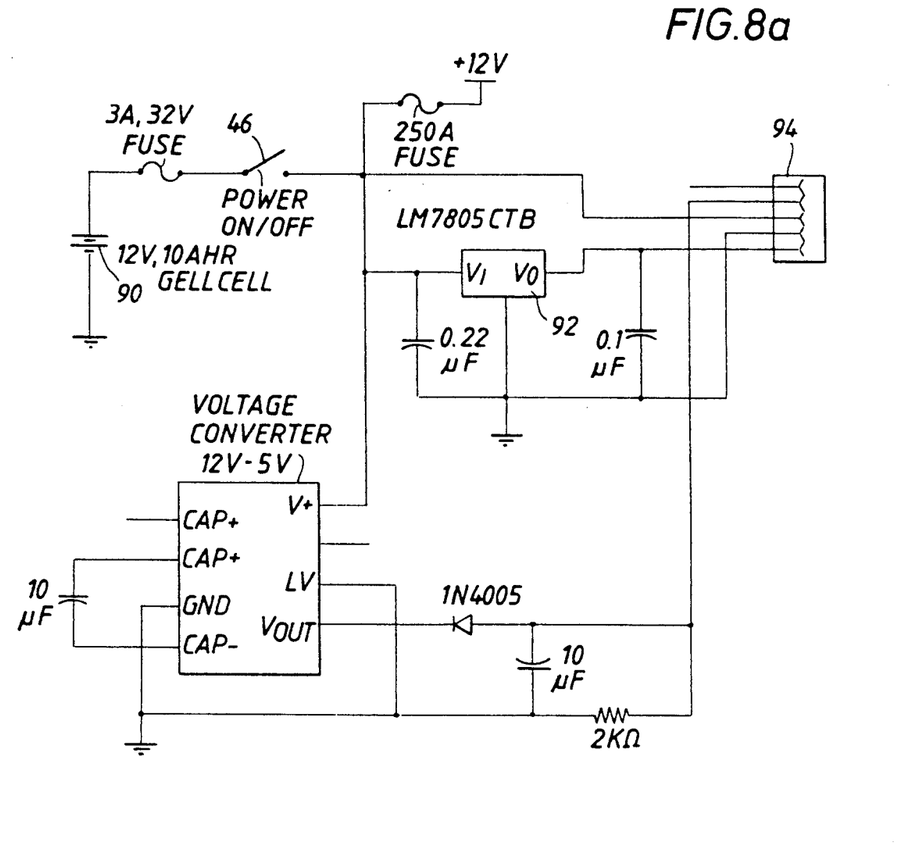
FIG. 8a and 8b are schematic diagrams of the power circuits of the computational package of FIG. 4.

The operator enters and receives test control data with computational package 40 using display 45, keypad 48, and printer 42. In the preferred embodiment, display 45 is a liquid crystal display displaying two lines of twenty (20) characters each, keypad 48 is a 16 key, 4×4 matrix unit, and printer 42 is a standard 40 column dot-matrix printer. Keypad 48 communicates with micro-controller 72 of FIG. 6A via connectors 78 and 80 of FIG. 6A and connector 82 of FIG. 7. Keypad 48 further communicates with printer 42 via connector 84 of FIG. 7. Computational package 40 also includes power on-off switch 46 (FIGS. 4 and 8A) and reset button 44 (FIG. 6A).

Computational package 40 interfaces with and receives multiplexed analog data in parallel from the signal processing system 100 of instrument package 20 via line 13 and connector 66. Signal processing system 100 is located under cover 28 of instrument package 20 in FIGS. 1-2 and is a data acquisition and signal transmitting system as depicted schematically in FIG. 5. System 100 translates the output of temperature transducer 26, remote temperature transducer 52, differential pressure transducer 62, and gauge pressure transducer 60 to a voltage between 0-5 volts for transmission to computational package 40 (FIG. 4).

Signal conditioning is accomplished with integrated circuit operational amplifiers in signal processing system 100 in any one of several common circuit designs for acquisition and transmission of data. All testing and data processing is performed in accordance with software stored in a 64 Kbit EPROM 74 and run using 8-bit micro-controller 72 which is an 8052AHBASIC processor produced by Intel Corporation (Santa Clara, Calif.). The use of the above-described Lucas Schaevitz pressure transducer as the differential pressure transducer 62 permits a resolution of ten (10) bits with minimal hardware or software changes.

Such hardware and software changes can be easily recognized and readily made by those skilled in the art having the benefit of this disclosure. For instance, A/D convertor 70 can be either an 8-bit or 10-bit converter depending upon the resolution of associated transducers. Furthermore, if the differential transducer 62 produced by Lucas Schaevitz, which has self-contained signal conditioning circuitry is utilized, the signal conditioning circuitry shown in FIG. 5 associated with differential transducer 62 can be omitted.

Data is received by computational package 40 from instrument package 20 via line 13 and connector 66 is multiplexed by multiplexor 68, converted to digital form by A/D converter 70. Both are stored in 64-Kbit RAM 76 and contemporaneously printed during testing by printer 42 which also prints the results of the testing once testing is completed. Micro-controller 72 communicates with the other integrated circuit chips in FIGS. 6A-B via three buses, each bus being dedicated for one of control, data, or address signals, respectively. For the sake of clarity, these buses are not depicted in their entirety but are simply labeled as such on the appropriate leads to the individual chips.

Figure 8B:
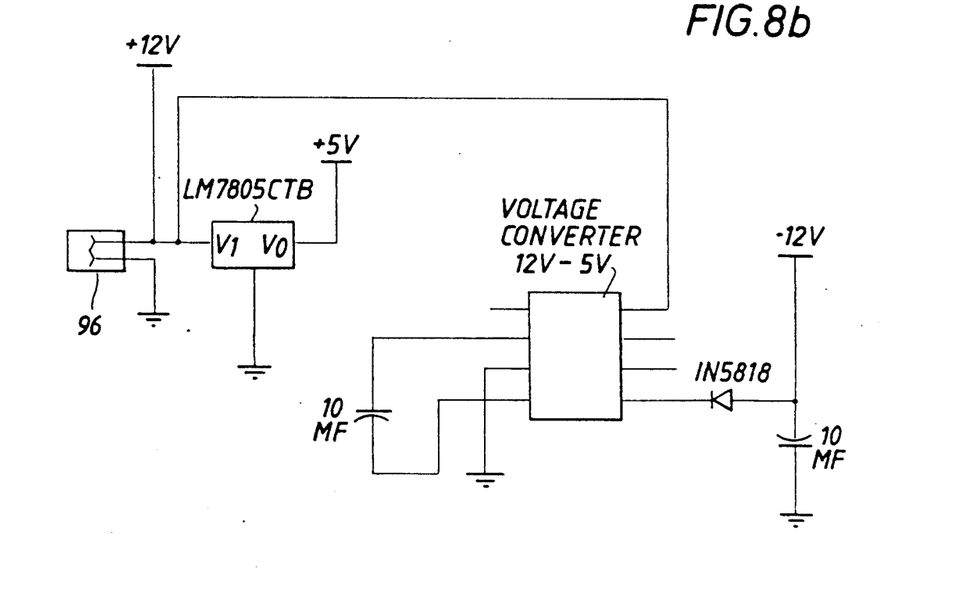

Computational package 40 is powered by, a 12 volt dc gell-cell battery 90 (shown in FIG. 8A) of a type produced by any of several manufacturers. The 12 volt signal is reduced to 5 volts by voltage limiter 92, and both 9 and 12 volt signal and a +5 volt signal are transmitted to other components via connector 94. The battery supply of battery 90 is capable of powering all electrical components of instrument package 20 via line 13 as well as those of computational package 40 for an entire day. Further, the battery supply can be recharged from the electrical system of truck 18 via a jack in the side of computational package 40 that is also not shown. Separate +12 volt and +5 volt signals are generated by the circuit depicted schematically in FIG. 8B for the purpose of producing a clean, independently generated reference signal for A/D converter 70 in FIG. 6 and transmitted by connector 96.

In conventional testing operations, the test unit comprised of instrumentation package 20 and computation package 40 is set up in the configuration illustrated in FIG. 1 and as previously described herein except that the test unit is not yet connected to line 10 or submersible pump 30. Selected steps in the subsequently described method of the invention are summarized in the flow chart of FIG. 9.

Figure 9:
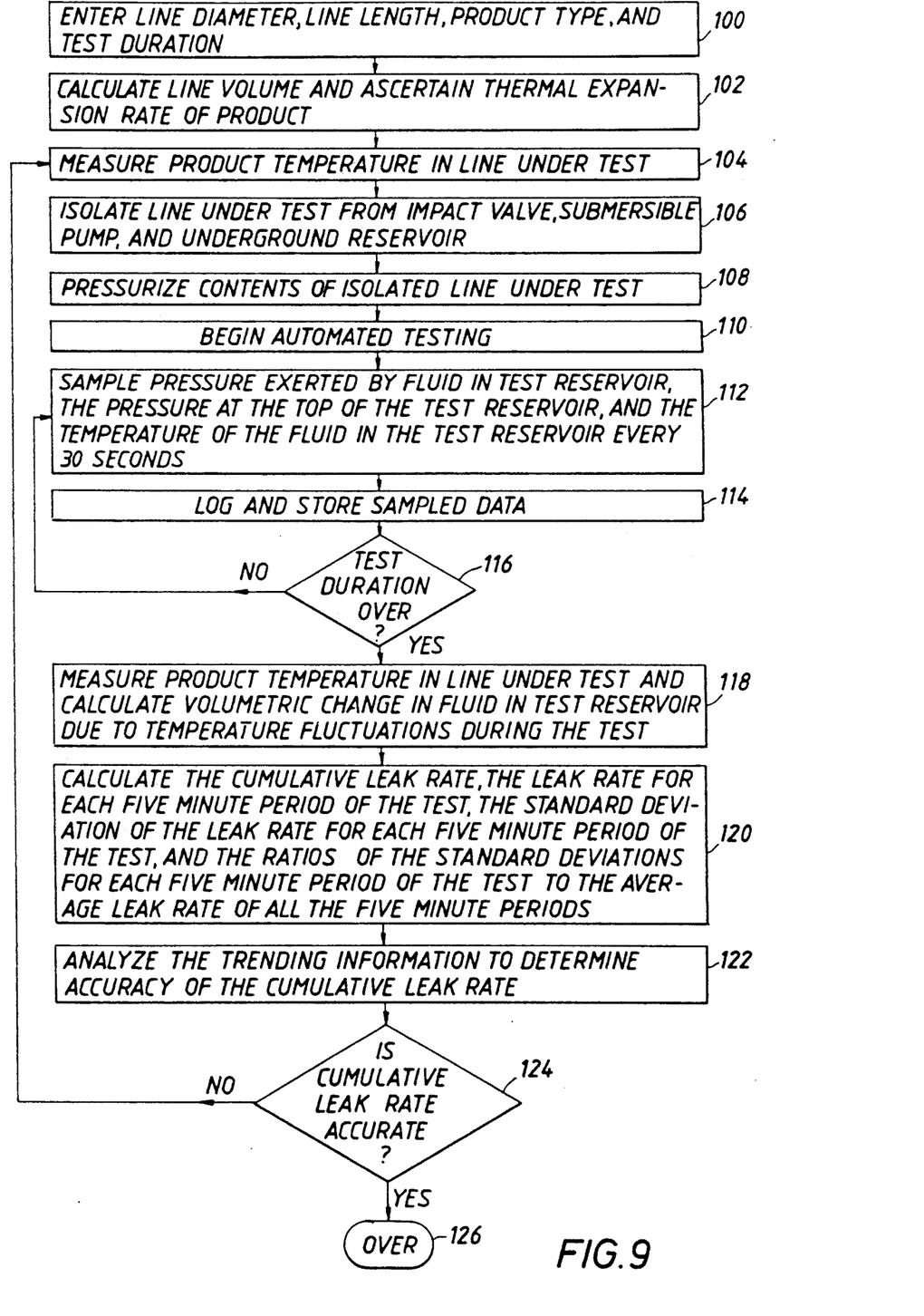
FIG. 9 is flow chart summarizing selected steps of a presently preferred embodiment of the method of the present invention.

Once the test equipment is set up, the operator must first enter selected test system parameters before the test begins (the step shown at reference numeral 100 in FIG. 9). These parameters include the diameter and length of line 10, the type of product contained in line 10 (which should be the same as that in underground reservoir 14), and the period of time over which the test will be conducted. This is done using keypad 48 and display 45 of computational unit 40. Computational package 40 then calculates the standard line volume of the line under test (line 10) and the cubic thermal expansion rate for the product contained in underground reservoir 14 in calculations during the test from the entered information (step 102).

This selected information must be entered correctly for the system to accurately account for the effect of temperature on volumetric change detected during the test. It is a well known scientific principle that the volume, temperature, and pressure of the contents of any closed system are interrelated as described by Boyle's law. Thus, errors in any of the entered quantities will translate into errors in volumetric measurement. An error in the calculated volume of line 10 will, for instance, thus cause an error in temperature correction.

Holding tank 22 of instrumentation package 20 shown in FIG. 2 must be filled with the same type of fluid as that stored in underground reservoir 14. A convenient way to obtain filling fluid is to obtain a small amount of fluid from reservoir 14 via dispensing pump 12, line 10 and submersible pump 30. Obtaining the fluid in this manner also has the advantage of ensuring that the line 10 is relatively full of fluid, thereby reducing the amount of vapor in line 10; even so, line 10 is likely to contain enough vapor to affect the test such that further reductions in the amount of vapor present in the line 10 as described below is beneficial. Also, it is because of the presence of the vapor in line 10 that line 10 is referred to herein as liquid fluid containing line. If the filling fluid from holding tank 22 is obtained in this manner, it must be done before line 10 is isolated from underground reservoir 14 and dispensing pump 12.

The temperature of the product in line 10 is measured (step 104) before testing regardless of whether fluid is obtained for holding tank 22 as described above. In the preferred embodiment of the method of the invention, the temperature is measured before line 10 is isolated from either dispensing pump 12 or reservoir 14. To measure the temperature, remote temperature sensor 52 is inserted into line 10 through the aperture in submersible pump 30 into which isolation plug 35 is fitted (shown in FIG. 3) when line 10 is isolated from reservoir 14 whereupon the temperature is taken and recorded. Once the temperature is taken, remote temperature sensor 52 is removed. If fluid is obtained for holding tank 22 in the manner described above, the temperature of the product in line 10 may alternatively be taken by simply inserting remote temperature sensor 52 into the product received through dispensing pump 12.

Since line 10 is the line to be tested for leaks, it must be isolated from the remainder of the pumping dispensing system (step 106). This is accomplished by manually closing impact valve 17 and modifying submersible pump 30 with isolation plug 35 as heretofore described. Line 10 must be filled with fluid to as great an extent as is practically possible during testing since air pockets or other gaseous deposits adversely impact the results of the test. Once line 10 is isolated, instrumentation package 20 is then placed in fluid flow communication with line 10 via line 11 and isolation plug 35. Instrumentation package 20 is then used to pressurize and depressurize the content of line 10 to cause vapor pockets to coalesce at either end of line 10 where they are bled off in order to remove any such gaseous pockets as is well known in the art.

Once instrumentation package 20 is connected to line 10 via line 11, fluid is allowed to drain from holding tank 22 into test reservoir 32 via filler line 21 and filler valve 34. Nitrogen valve 25 is opened, thereby allowing nitrogen to be received via nitrogen quick connect 27 into test reservoir 32 from the source of pressurized nitrogen aboard truck 18 and via line 13, thereby placing the entire test system under pressure (step 108). Vapor pockets in the isolated system will coalesce and flow to one end of the isolated system or the other where they are bled and eliminated. Repetition of this process will increase its effectiveness although the preferred embodiment of the invention contemplates only two or three repetitions. Once the vapor pockets are removed from the system under test, test reservoir 32 is again filled and placed under 50 psi using nitrogen. In the event of over-pressurization, pressure is bled using relief valve 23. The system is then ready for testing.

Once the vapor pockets are removed, testing is begun and is actually conducted by software stored in data processing circuitry housed in computational package 40 (step 110) as more fully described below. Pressure and temperature data are collected by differential pressure transducer located under cover 28, temperature transducer 26, gauge pressure transducer located under cover 28 and remote temperature sensor 52, and transmitted by signal processing system 28 from instrumentation package 20 to computational package 40 through line 13. The pressure exerted by the fluid in the reservoir, the pressure at the top of the reservoir, and the temperature of the fluid in the reservoir, are sampled every thirty seconds (step 112) for the duration of the test and permanently recorded with printer 42. This data is also stored in (step 114) random access memory 76 in computational package 40. Typical test runs in the preferred embodiment are of thirty or sixty minutes, but test runs may be of different durations. The system reads the data at thirty second intervals and logs it to printer 42.

Once the test is over (step 116), the temperature of the product in the line is then measured again using the remote temperature sensor 52. Once the post-test temperature is taken, the software then calculates the volumetric change in the fluid in test reservoir 32 and in line 10 due to temperature fluctuations as determined from post-test and pre-test readings. This volumetric change due to temperature is then used to correct the overall measured change in volume of the total amount of fluid found in both reservoir 32 and line 10 (step 118).

Theoretically, line 10 was completely fluid filled when testing began and any fluid loss is the result of leakage of liquid fluid from the sealed test system, and is reflected in the change in fluid level in test reservoir 32. Total volumetric change can therefore be derived from the height of fluid in test reservoir 32. The current invention calculates the column height as measured by the differential pressure transducer of fluid in graduated cylinder/test reservoir 32 at any given time during the test procedure from the weight of the column of fluid in test reservoir 32. The weight, in turn, is determined by the difference in pressures exerted by the fluid in test reservoir 3 at the top of the column and at the bottom as measured by differential pressure transducer 62. The weight of the fluid is then calculated from the differential pressure with the product's particular specific gravity in accordance with the known formula.

The micro-controller of computational package 40 calculates the algebraic sum of all the measured volumetric changes and converts that sum to a cumulative leak rate measured in gallons per hour. The leak rate for each five minute period of the test is also calculated (step 120) and the standard deviation of the leak rate for each such period is divided by the average leak rate of all the five minute periods to obtain an arbitrary comparison value for each five minute period. Each of these values is logged by printer 42.

The micro-controller of computational package 40 therefore outputs not only data indicating the overall or cumulative performance of the system under test, but also information broken down into five minute "trending" periods. Thus, the validity of the measured cumulative leak rate is determined by analyzing the trending information (step 122) to ascertain whether the trending information meets preselected criteria of change. If the trending information is erratic or shows that the leak rate has not leveled off, then the measured cumulative leak rate from that particular test is suspect and the testing should be conducted again (step 124).

The preselected criterium in the preferred embodiment is operator selectable to accommodate the demands of the customer while complying with governmental regulatory requirements. For instance, when conducting the method for a customer in the United States who wishes to comply with minimal governmental requirements (i.e., maximum leak rate of 0.1 gallons per hour) one might specify a cumulative leak rate of not more than 0.00825 gallons over two successive five minute intervals. However, if the calculated leak rates are trending to zero or are otherwise decreasing, then it is generally appropriate to assume that no leak exists and that the calculated leak rates are the result of electronic noise in the system.

The preferred embodiment of the invention also contemplates using a sound alarm although it is not necessary to the practice of the invention. The alarm sounds when either there is an insufficient amount of liquid fluid in test reservoir/graduated cylinder 32 to continue the test or when the test is over. In the first situation, circuitry is provided to monitor pressure data, received from instrument package 20, to insure that the liquid fluid level is above a preselected, minimum threshold level and sounds an alarm if it is not. In the latter situation, the alarm is simply sounded at the end of the test.

Although described in terms of the above preferred embodiments, the method and apparatus of the present invention are not so limited, the above description having been set out as being illustrative of the invention for the purpose of compliance with the disclosure requirements of the Patent Statute. Those skilled in the art who have the benefit of this disclosure may well be able to make certain changes in the described embodiments which do not change the manner in which the various elements of these embodiments function to achieve the results desired. All such changes are intended to fall within the scope of the following claims.

What is claimed is:

1. An apparatus for analyzing signals representing the pressure in an isolated liquid fluid containing line to test for the presence of a leak in the line, comprising:

means for measuring the temperature of the liquid in the liquid fluid containing line before and after the testing and for transmitting a signal representative thereof;

means for measuring the temperature and pressure of the liquid in a test reservoir in fluid communication with the liquid fluid containing line and for transmitting a signal representative of the measured temperatures and the measured pressure therein;

means for receiving the signals from each of said temperature and temperature and pressure measuring means for calculating therefrom a cumulative leak rate at selected time intervals; and means for comparing the calculated cumulative leak rate at each selected time interval to develop trending information for analyzing by comparing the calculated leak rate at each successive time interval to ascertain whether a preselected criterium of change is met to determine the rate of liquid fluid leakage from the liquid fluid containing line and validating the calculated cumulative leak rate.

2. The apparatus of claim 1 additionally comprising means for increasing the pressure in the liquid fluid containing line during the test.

3. The apparatus of claim 2 wherein the pressure increasing means comprises means for pressurizing the test reservoir.

4. The apparatus of claim 3 wherein said pressure measuring means comprises means for measuring differential pressure in the test reservoir.

5. The apparatus of claim 2 wherein said pressure measuring means comprises a differential pressure transducer.

6. An apparatus for testing an isolated liquid fluid containing line, comprising:

an instrument package further comprising
a test reservoir containing fluid,
a differential pressure transducer mounted to the test reservoir for measuring the pressure exerted by the fluid and generating an electrical signal proportional thereto,
a temperature transducer mounted in the test reservoir for measuring the temperature of the fluid and generating an electrical signal proportional thereto,
a gauge pressure transducer mounted in the test reservoir for measuring the pressure exerted by the atmosphere in the test reservoir and generating an electrical signal proportional thereto,
a remote temperature sensor for measuring the temperature of the ambient atmosphere and generating an electrical signal proportional thereto, and
means for transmitting the electrical signals generated by the differential pressure transducer, the temperature transducer, the gauge pressure transducer, and the remote temperature sensor;
a computational package that receives the electrical signals transmitted from said instrument package, records the data transmitted in the electrical signal, and calculates leak rate data of the liquid fluid containing line at preselected intervals during a selected test period and a cumulative leak rate for the entire test period;

means for connecting the test reservoir of said instrument package to the liquid fluid containing line; and means for connecting the test reservoir of said instrument package to a pressurized source of gaseous fluid for raising the pressure to the liquid fluid containing line after connecting said instrument package to the liquid fluid containing line.

7. A method for testing the leakage rate of fluid from a liquid fluid containing line, comprising the steps of:

isolating a liquid fluid containing line from a liquid containing underground reservoir connected to one end of the line and from an impact valve connected to the other end of the line;

connecting the isolated line to a test reservoir filled with the liquid fluid contained in the line;

pressurizing the fluid in the isolated line having the test reservoir connected thereto;

obtaining data representative of changes in temperature and pressure levels in the isolated line having the test reservoir connected thereto by measuring pressure and temperature changes in the test reservoir over a preselected test period at preselected time intervals;

calculating a cumulative leak rate from the temperature and pressure levels at each time interval and comparing the cumulative leak rate at each time interval to develop trending information from the data; and analyzing the trending information to ascertain whether the trending information meets preselected criteria of change to determine whether the calculated cumulative leak rate is an accurate measurement of the actual rate of leakage of the liquid fluid from the fluid filled line.

8. The method of claim 7 wherein the trending information is calculated at five minute intervals of the preselected test period and includes at least one of the leak rate for each respective interval, the standard deviation of each respective interval, the standard deviation of the leak rate for each respective interval, or the ratios of the standard deviation of each respective interval to the average leak rate of all the intervals.

9. The method of claim 7 wherein the test reservoir is pressurized and the pressure changes in the test reservoir are measured by measuring differential pressure.

10. The method of claim 7 wherein the liquid fluid containing line is alternately pressurized and depressurized to remove gaseous pockets therefrom before connecting to the test reservoir and isolation thereof.

11. The method of claim 7 wherein the trending information is obtained by determining the standard deviation of the calculated leak rate at each time interval and dividing by the average leak rate of all the time intervals to obtain a value for each time interval for comparing to the preselected criteria of change.

12. An apparatus for detecting leaks in a liquid fluid filled line that is closed at both ends comprising:

a test reservoir filled with the same fluid as is contained in a liquid fluid filled line to be tested for leaks;

a line connecting said test reservoir to the liquid fluid filled line;

means for sensing the temperature of the liquid in the liquid fluid filled line;

a source of inert gas for pressurizing the liquid fluid filled line and said test reservoir;

means for sensing the pressure in said test reservoir; and a software driven micro-controller for calculating the rate of leakage from the liquid fluid filled line from changes in the pressure in said test reservoir at selected time intervals, correcting the calculated leak rate for volumetric change in the liquid fluid filled line due to any temperature change which may be measured, calculating a comparison value from the standard deviation of the leak rate for each time interval, and comparing the comparison value to a preselected criterium of change, a comparison value in excess of the preselected criterium of change indicating a leak rate in excess of a specified leak rate.

13. The apparatus of claim 12 wherein the inert gas is introduced into said test reservoir above the liquid contained therein.

14. The apparatus of claim 13 wherein said pressure sensing means comprises a differential pressure transducer.

15. The apparatus of claim 13 additionally comprising a keypad for operator input into said micro-controller.

16. The apparatus of claim 13 additionally comprising a printer for making a record of the calculated leak rate for each time interval and the respective comparison value.

* * * * *